TWO SPEED ARITHMETIC CALCULATOR
Filed Oct. 18, 1966
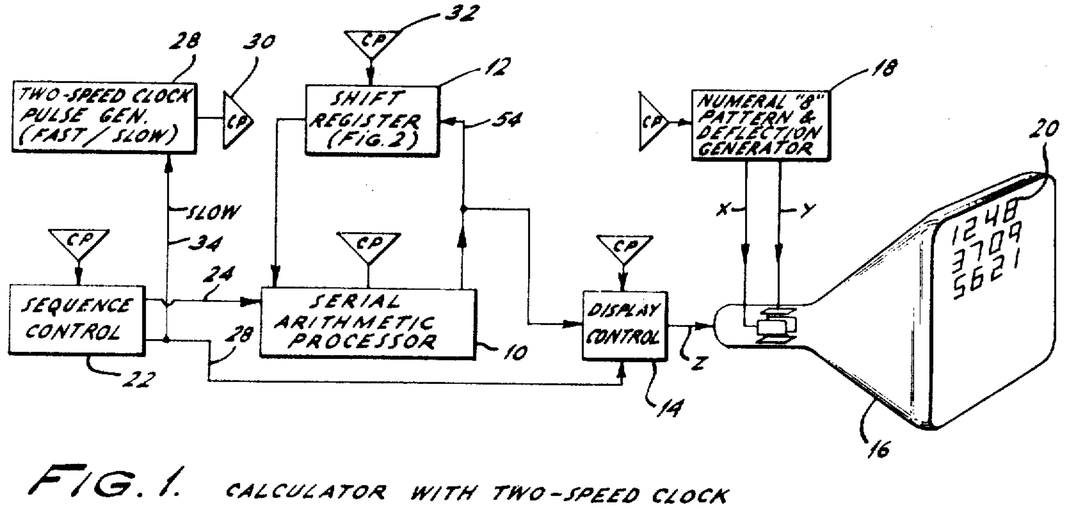
FIG. 1. CALCULATOR WITH TWO-SPEED CLOCK
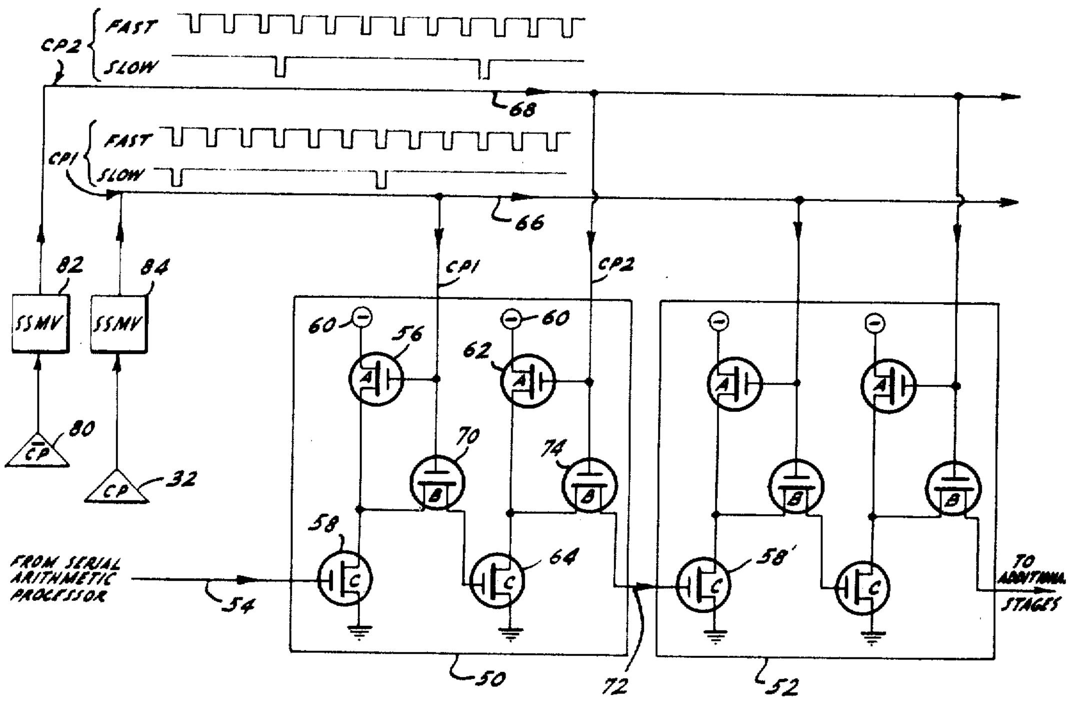
FIG. 2. SHIFT REGISTER 12 OF FIG. 1.
MOST TRANS- A-10
CONDUCTANCES B-40
(μMHOS): C-100
INVENTORS
HOWARD Z. BOGERT
JAY G. MINER
BY
D P Pressman
ATTORNEY

United States Patent Office 3,453,601
Patented July 1, 1969

3,453,601

TWO SPEED ARITHMETIC CALCULATOR

Howard Z. Bogert, Cupertino, and Jay G. Miner, Sunnyvale, Calif., assignors to Philco-Ford Corporation, Philadelphia, Pa., a corporation of Delaware

Filed Oct. 18, 1966, Ser. No. 587,448
Int. Cl. G11b *13/00*
U.S. Cl. 340—172.5 10 Claims

ABSTRACT OF THE DISCLOSURE

Recirculating arithmetic calculator employing an arithmetic processor and a dynamic display means which is activated after completion of the arithmetic processor's operations. During its arithmetic mode, the calculator is clocked with high frequency pulses to obtain high calculating speel, and during its subsequent display mode, the calculator is clocked with low frequency, low duty cycle pulses to minimize power consumption. The calculator may employ active element circuits, such as a shift register and load transistors periodically rendered conductive by clock pulses. In this arrangement power consumption will be proportional to the duty cycle of the clock pulses.

This invention relates to computing machines and more particularly to a serial type recirculating arithmetic calculator having dual operating speeds. In the following discussion, the invention will be described with reference to its application in an electronic calculator of the type which utilizes a recirculating memory to provide temporary storage during calculation and to provide a recurrent drive for a dynamic output display unit. However the invention is fully applicable to stored program type computers which use a recirculating memory to drive a dynamic output display inasmuch as such a computer includes circuitry similar to the present calculator, differing therefrom principally in that it also includes a stored program capacity and a multiple address memory.

In the aforementioned type of arithmetic calculator, a clock pulse generator is provided to drive the various circuits of the calculator in synchronism. Heretofore the clock pulses supplied by such a generator were of a fixed frequency which was set at the maximum reliable operating speed of the slowest component of the calculator. In a typical recirculating calculator the slowest component is usually the dynamic display device (e.g., a cathode ray tube numerical displayer). Since a dynamic display device is able to operate at only a fraction of the speed of a serial arithmetic processor, it will be apparent that utilization of a fixed frequency clock pulse generator severely limits calculating speed. In a desk-type electronic calculator, for example, typical arithmetic calculations will usually take as long as several seconds if the calculator is clocked by a single frequency clock pulse generator. This is highly undesirable, as will be recognized by those experienced in usage of desk-type calculators.

Another disadvantage found in calculators which use a fixed frequency clock pulse generator is unnecessarily high power consumption during the display mode. In a calculator of a type wherein the display device is driven by active element circuits, such as a shift register, which utilize active elements which are strobed (i.e., gated into an operative state) by the clock pulses, the percentage of time that the active element circuits are "on" and consuming power will be proportional to the duty cycle of the clock pulse waveform. In a calculator of the type which utilizes a single frequency clock pulse generator, the duty cycle of the clock pulse waveform during the display mode is, of course, the same as that during the calculating mode; hence the power consumed in the shift register and other strobed circuits which are operative during both the display and calculating modes will be the same in both modes, This is highly wasteful of power since a desk top calculator will operate in the display mode hundreds to thousands of times longer than it operates in the calculating mode. In addition to power wastage, the unnecessary heat produced during the display mode shortens the life and decreases the reliability of electronic components, especially in view of the fact that the display mode of a desk top calculator often occurs for hours at a time. When such electronic components are formed entirely within monolithic integrated circuits, the heat generated in these circuits is particularly harmful, as will be recognized by those skilled in the art.

Accordingly, several objects of the present invention are: (1) to provide an arithmetic calculator whose calculating speed is not limited by the maximum speed by which a dynamic display unit can be operated, (2) to provide an arithmetic calculator whose display unit can be operated at a relatively slow speed for ease of display and lower reduction but whose arithmetic processing unit can be operated at its maximum speed for minimizing computation time, (3) to provide an arithmetic calculator which utilizes, comparatively little power and generates comparatively little heat during the display mode, and (4) to provide an arithmetic calculator of increased reliability and longevity. Other objects and advantages of the present invention will be apparent from a consideration of the ensuing description thereof.

SUMMARY

According to the present invention an arithmetc calculator which includes a serial type recirculating memory and dynamic display means driven by said memory utilizes a two speed clock pulse generator for clocking the components of the calculator at a relatively fast speed during computation operations and a relatively slow speed during the display mode.

DRAWINGS

FIG. 1 shows a block diagram of a calculator according to the invention.

FIG. 2 shows a schematic diagram of a shift registei which may be used in the calculator of FIG. 1.

*FIG. 1*

The calculator of FIG. 1 comprises a serial arithmetic processor 10 for performing arithmetic operations on serial binary digital data, a shift register 12 for providing a dynamic memory for processor 10, and a display control unit 14 which is arranged to receive information from processor 10 and supply said information in a suitable form for display purposes to display unit comprising a cathode ray tube 16. Connected to the vertical and horizontal deflection plates (X and Y inputs) of tube 16 is a typical numeral 8 pattern and deflection generator 18 which is arranged to cause an electron beam, when generated at the cathode of tube 16, to trace out a series of rows of numeral 8's such as shown at 20 on the faceplate of the tube. Each 8 is formed of a matrix of straight strokes of the electron beam. Under control of the display unit 14, the Z axis input of the cathode ray tube is modulated in order to blank completely or illuminate selected strokes of the numeral 8's so as to write blanks or numbers on the faceplate of tube 16 as shown. The operation of the calculator is programmed by a sequence control or phase counting unit 22 which, via connection 24, causes the arithmetic processor 10 to perform an assigned operation on input data supplied to the calculator from a suitable input unit (not illustrated), and via lead 26, to activate the display control 14 so that the information circulating from processor 10 to register 12 and back to processor 10 will be displayed on the faceplate of cathode ray tube 20 during the display mode. The calculator is driven by a clock pulse generator 28 which is arranged to supply on its output terminal 30 synchronizing and operating clock pulses for all of the components of the calculator (except tube 16). Each component has a clock pulse input terminal, such as terminal 32 of shift register 12, to which clock pulses from terminal 30 are supplied.

All of the elements of the calculator aforedescribed are well known and familiar to computer engineers. A serial computer which embodies the calculator shown is described for example, on pages 316 et seq. of Digital Computer Fundamentals by Bartee (McGraw-Hill 1960) and on page 367 of Analog and Digital Computer Technology by Scott (McGraw-Hill 1960). A suitable dynamic display unit similar to that shown is described in the articles Computer Generated Displays by Loewe et al., 49 Proc. IRE 185, January 1961), and Alphanumeric Characters On Any Cathode Ray Tube in Military Systems Design, July-August 1960. The shift register 12 of applicants' circuit is of course interchangeable with one track of the drum type recirculating serial memory shown in Bartee.

The operation of the calculator of FIG. 1 is apparent from the descriptions given in the aforementioned and other texts and will not be described in detail here. Generally, the calculator of FIG. 1 is operated by first entering information (e.g., a multiplicand) into the recirculating loop including storage register 12. Thereafter additional information (e.g., a multiplier) is entered into the calculator. Sequence control unit 22 is thereafter activated (e.g., by pressing a "=" key). Control 22 will cause the calculator to perform the assigned operation on the input data, and after the operation is completed and the desired output information is circulating through register 12, control 22 will energize lead 28 to allow the display control 14 to convert the binary digital information circulating in the loop to a suitable decimal code for application to the Z axis input of cathode ray tube 16 in order to display the circulating information visually. This display means including elements 14, 16, and 18 is a dynamic display unit because it operates by writing the information circulating in the register on a temporary display medium (the faceplate of tube 16) each time the information circulates around the register.

In prior art calculators of the type shown in FIG. 1 the clock pulse generator 28 provided clock pulses of a single, fixed frequency only. While it is of course desirable to have the output frequency of the clock pulses supplied by generator 28 as high as possible to minimize calculation time, it was not possible to do so because the maximum operating speed of the display units 14, 16, and 18 was far less than that at which the arithmetic unit 10 could operate. Hence the calculating speed of prior art calculators was below that of which the arithmetic circuits more capable. Furthermore, much unnecessary power and heat was generated during the display mode when strobed logic and shift register circuits were used since the duty cycle of the single frequency clock pulses was the same during calculation and display modes.

According to the invention, the clock pulse generator 28 is designed to supply dual frequency clock pulses alternatively, i.e., high frequency clock pulses during the calculation mode and low frequency clock pulses during the display mode. In this way the calculation time can be minized by supplying the clock pulses during the calculation mode at the maximum frequency which can be handled reliably by the arithmetic processing units. Also, power consumption and heat dissipation during the display mode can be minimized in strobed circuits by supplying the clock pulses at the same width but at a frequency just high enough to prevent perceptible flicker of the displayed image. Of course the duty cycle of the clock pulses supplied during the display mode should be less than that of the clock pulses supplied during the computation mode. Desirably the width of the high and lower frequency clock pulses should be the same; thereby the duty cycle of the low frequency clock pulses will be reduced in proportion to the frequency reduction thereof.

In one embodiment of a typical desk top solid state electronic calculator using strobed circuits, the clock pulses were supplied during the calculation mode at a frequency of 330 kHz. with 50% duty cycle while during the display mode their frequency was reduced to 60 kHz. without changing the width thereof. The power consumed during calculation was 30 watts while during the display mode the power consumed was 20 watts, the difference of 10 watts being represented as a reduction of heat dissipated in the integrated circuits of the calculator due to the shorter duty cycle of the low frequency clock pulses.

It will therefore be apparent that the provision of a two speed clock pulse generator will provide increased calculation speed with reduced display mode power consumption and heat dissipation.

The implementation of a two speed clock generator with a fast speed for computation mode and a slow speed for the display mode can be achieved, for example, by providing for clock pulse generator 28 a dual frequency astable multivibrator which normally oscillates at the desired fast or high frequency rate but which can be made to oscillate at the slow or low frequency rate by gating in a different set of timing resistors in response to energization of a "slow" input lead 34 thereof. The multivibrator 28 can be made to operate at the slow rate during the display mode by connecting the slow lead 34 thereof to the display control lead 28 of the sequence control unit 22. Other suitable systems of implementing the operation of the two speed clock pulse generator will be apparent to those skilled in the art.

*FIG. 2*

As stated, if the shift register 12 of FIG. 1 and optionally the other logic circuits which are active during the display mode are of the type which embody active element circuits which are strobed on by each clock pulse, a great reduction in power consumed and heat generated will be effected during the display mode if the low frequency clock pulses utilized to drive the calculator during the display mode have a shorter duty cycle than the fast clock pulses. To illustrate clearly the power-saving feature of the invention, FIG. 2 shows the circuitry of one such shift register, i.e., of the type which uses stages which are strobed on by the clock pulses.

The shift register of FIG. 2 is composed of a plurality of identical cascaded stages such as 50 and 52, each of which includes six Metal-Oxide-Silicon-Transistors (MOST's). Details of the construction and operation of the MOST, which is also known as an Insulated Gate Field Effect Transistor, are given in the IEEE Transactions on Electron Devices, July 1964, pp. 324–345. In practice, the MOST's shown are not discrete devices with external interconnections but rather are all formed entirely within an integrated circuit consisting of a monolithic chip of silicon. A monolithc shift register as shown having 100 stages with 6 MOST's per stage is currently marketed by the Microelectronics Division of Philco Corporation, Santa Clara, Calif., and is described fully in the co-pending application of Howard Z. Bogert, Ser. No. 498,026 filed Oct. 19, 1965, entitled "Memory Device," now Patent 3,395,292, granted July 20, 1968.

In the first stage 50 of the shift register, the source and drain electrodes of MOST's 56 and 58 are connected in series across a negative upply source 60. The source and drain electrodes of MOST's 62 and 64 are similarly connected. The gate electrode of MOST 58 is connected to input lead 54 and the gate electrodes of MOST's 56 and 62 are connected to buses 66 and 68, respectively, which supply clock pulses CP1 and CP2, respectively. The junction of MOST's 56 and 58 is connected to the gate of MOST 64 by way of an isolating MOST 70, and the junction of MOST's 62 and 64 is connected to the output terminal 72 of stage 50 by way of a second isolating MOST 74. The gate electrodes of MOST's 70 and 74 are also connected to buses 66 and 68 respectively. Desirably the MOST's are designed to have the transconductances indicated by the legend in the lower left hand corner of the drawing.

In operation, each stage of the shift register is strobed with out-of-phase clock pulses CP1 and CP2 which are shown for both the fast and slow modes in the waveform diagram above the shift register. The clock pulses are described as "out-of-phase" clock pulses because the pulses in each train occur during mutually exclusive time intervals. A binary digit, which may be a ONE (negative voltage) or ZERO (ground voltage) is supplied to the input terminal 54 of the first stage 50 of the shift register. The binary digit will be shifted through the shift register by the clock pulses CP1 and CP2 and will appear at the output of successive stages of the shift register at successive intervals equal to the period of the CP2 pulses. Thus if the out-of-phase clock pulses CP1 and CP2 occur at the fast rate, the binary digits will be shifted through the shift register rapidly and if the clock pulses occur at the slow rate, the binary digits will be shifted through the register at a slow rate.

For example, assume that a negative voltage representing a binary ONE is supplied to input lead 54. This voltage will charge the gate electrode capacitance of MOST 58 so as to bias MOST 58 in a state whereby the normal substantially infinite impedance between the source and drain electrodes of the MOST will be lowered greatly when a negative voltage is supplied to the drain electrode of the MOST. Thus, when the next clock pulse CP1 is supplied to the gate electrodes of MOST's 56 and 70, all three MOST's 56, 58, and 70 will be driven conductive and a low impedance path will be provided between the gate electrode of MOST 64 and ground by way of MOST's 70 and 58. Hence any charge present on the gate electrode of MOST 64 will be bled away during CP1.

The next clock pulse to occur will be CP2 on lead 68 which supplies a negative voltage to the gate electrodes of MOST's 62 and 74, causing these devices to become conductive. Since no charge is present on the gate electrode of MOST 64, this device will not conduct; hence a low impedance path will be created between negative source 60 and the gate electrode of MOST 58' of stage 52 by way of MOST's 62 and 74. Thereby a negative output voltage will be provided on lead 72 which is indicative of the transference of the binary ONE from stage 50 to stage 52.

The aforedescribed sequence of events will thereafter be repeated in stage 52 in an identical manner when the next CP1 and CP2 clock pulses arrive, causing the binary ONE to appear at the output of stage 52 one cycle later.

If a ZERO is supplied to input lead 54 of stage 50, no charge will be placed on the gate electrode of MOST 58 and the CP1 clock pulse will turn MOST's 56 and 70 on, providing a relatively low resistance path between negative source 60 and the gate electrode of MOST 64 by way of MOST's 56 and 70. When the next clock pulse CP2 is supplied to the gate electrodes of MOST's 62 and 74, all three MOST's 62, 64, and 74 will be turned on, providing a low impedance path between the gate electrode of MOST 58' and ground by way of MOST's 74 and 64, thereby providing ZERO volts on lead 72 and "transferring" the binary ZERO to stage 52.

The out-of-phase clock pulses CP1 and CP2 can be derived from the input clock pulses applied to input terminal 32 by first providing the inversion of the clock pulses ($\overline{CP}$) at terminal 80 (e.g., by inverting the input clock pulses or by connecting a lead to the other side of astable multivibrator from which the input clock pulses were derived). The clock pulses CP and $\overline{CP}$ are then applied to respective single shot multivibrators 82 and 84 which provide the respective out-of-phase pulse trains CP1 and CP2. If the input pulses CP occur at the fast rate, the driving clock pulses CP1 and CP2 will occur at a fast rate as shown by the upper waveforms over buses 66 and 68, respectively. When the clock pulses occur at the slow rate, CP1 and CP2 will occur at a slow out-of-phase rate as indicated by the lower waveforms over buses 66 and 68, respectively. Since CP1 and CP2 are generated in single shot multivibrators 82 and 84, they will have a constant width, irrespective of their frequency.

It will thus be appreciated by those skilled in the art that since the duty cycle of the CP1 and CP2 clock pulses is substantially shorter at the slow rate, the shift register will consume substantially less power during the slow clocking rate. In addition, if display control 14, processor 10, and generator 18 are designed using strobed active element circuits, a greater power saving can be effected.

The shift register at FIG. 2 can be implemented by conventional transistors connected in the same manner as indicated; however, MOST's are to be preferred since more MOST's can be fabricated in a given area of a silicon microcircuit monolith at lower cost.

While there has been described what is at present considered to be the preferred embodiment of the invention, it will be apparent that various modifications and other embodiments thereof will occur to those skilled in the art within the scope of the invention. Accordingly, it is desired that the scope of the invention be limited by the appended claims only.

We claim:

1. A recirculating arithmetic calculator, comprising, in combination:

(a) a source for supplying clock pulses at either a relatively high frequency or a relatively low frequency, (b) a serial arithmetic processor for performing arithmetic operations on digital information at a speed governed by the frequency of said clock pulses, (c) a shift register for continuously receiving digital information in serial form from said arithmetic processor and recirculating said information, at a speed determined by the frequency of said clock pulses, through a plurality of stages thereof, to said arithmetic processor, (d) dynamic display means for visually displaying, in response to a display command signal, said information at the same location in a temporary display medium each time said information circulates through said register, (e) sequence control means for programming the operation of said arithmetic processor and providing said display command signal to activate said display means upon completion of said arithmetic operations, and (f) means for causing said source to supply said clock pulses (1) at said relatively high frequency while said arithmetic operations are performed and (2) at said relatively low frequency while said display means is activated.

2. The calculator of claim 1 wherein means are provided for supplying said clock pulses to at least said shift register at a substantially constant width irrespective of the frequency of said clock pulses, and wherein each stage of said shift register comprises at least one series circuit connected across a biasing source, said circuit including two serially-connected variable impedance devices, each of said devices having an impedance control electrode, said digital information being supplied to the control electrode of one of said devices and said clock pulses being supplied to the control electrode of the other of said devices, whereby the average power consumed by said shift register will be less when said clock pulses are supplied to said shift register at said slow rate.

3. The calculator of claim 2 wherein said means for supplying said clock pulses to said shift register is arranged to supply first and second out-of-phase trains of pulses, the pulses in each train being of constant width irrespective of the frequency of said clock pulses, and wherein each stage of said shift register contains first and second of said series circuits, each circuit including first and second series-connected MOST's, each stage having an information input terminal connected to the gate electrode of the first MOST of said first circuit, the gate electrodes of said second MOST's of said first and second series circuits being driven by said first and second pulse trains, respectively, the junction of said MOST's of said MOST's of said first circuit being connected to the gate electrode of said first MOST of said second circuit by way of a first isolation MOST whose gate electrode is driven by said first pulse train, the junction of said MOST's of said second circuit being connected to an output terminal of said stage by way of a second isolation MOST whose gate electrode is driven by said second pulse train.

4. The calculator of claim 1 wherein said dynamic display means comprises a cathode ray tube and associated means for converting digital numerical information circulating through said register into a decimal display across the face of said cathode ray tube.

5. The calculator of claim 1 wherein said (f) means is arranged to cause said source to change the frequency of said clock pulses from said relatively high frequency to said relatively low frequency in response to said display command signal.

6. A recirculating arithmetic calculator which includes a serial arithmetic processor for performing arithmetic operations on binary-encoded information at a rate governed by the frequency of received clock pulses, a shift register arranged to receive said information from an output of said arithmetic processor and circulate said information through a plurality of stages thereof and back to an input of said arithmetic process at a rate governed by the frequency of received clock pulses, dynamic display means arranged to display visually, in response to a display command signal, said information at the same location in a temporary display medium each time said information circulates through said register, a sequence controller for programming the operation of said arithmetic processor and providing said display command signal to said display means upon completion of said arithmetic operations, and a clock pulse source for driving all of the aforelisted elements at a rate governed by the frequency of clock pulses supplied thereby, said calculator being characterized in that (1) said clock pulse source is arranged to supply clock pulses at either a relatively high frequency or a relatively low frequency, (2) means are included for causing said colculator being characterized in that (1) said relatively high frequency while said arithmetic operations are performed and (b) at said relatively low frequency while said display means is activated.

7. The calculator of claim 6 wherein each stage of said shift register includes at least one series circuit connected across a bias source, said circuit including at least one impedance device which has a high impedance state when not supplied with a strobe pulse and a low impedance state when supplied with said strobe pulse, and including means for deriving from said clock pulses strobe pulses of proportional frequency and supplying said strobe pulses to each of said controllable impedance devices of said shift register, the duty cycle of said strobe pulses being smaller when said clock pulses occur at said relatively low frequency, whereby said shift register will consume less power while said display means is activated.

8. The calculator of claim 7 wherein each stage of said shift register is fabricated of a plurality of MOST's and wherein a plurality of stages of said shift register are formed within a monocrystalline silicon monolith.

9. The calculator of claim 6 wherein said dynamic display means comprises a cathode ray tube and means for writing said binary-encoded information circulating in said register across the face of said cathode ray tube in decimal form by means of an electron beam each time said information circulates through said register.

10. The calculator of claim 6 wherein means are provided for causing said source to change the frequency of said clock pulses from said relatively high frequency to said relatively low frequency in response to said display command signal.

References Cited

UNITED STATES PATENTS

| | | | |
|---|---|---|---|
| 3,257,645 | 6/1966 | Lekven | 340—172.5 |
| 3,293,614 | 12/1966 | Fenimore et al. | 340—172.5 |
| 3,362,014 | 1/1968 | Hauck | 340—172.5 |

GARETH D. SHAW, *Primary Examiner.*

RAULFE B. ZACHE, *Assistant Examiner.*

U.S. Cl. X.R.

235—152; 340—324

PO-1050
(5/69)

UNITED STATES PATENT OFFICE
CERTIFICATE OF CORRECTION

Patent No. 3,453,601 Dated July 1, 1969

Inventor(s) H. Z. Bogert and J. G. Miner

It is certified that error appears in the above-identified patent and that said Letters Patent are hereby corrected as shown below:

Column 8, line 5, "colculator being characterized in that (1)" should read -- source to supply said clock pulses (a) at --.

SIGNED AND
SEALED

OCT 21 1969

(SEAL)
Attest:

Edward M. Fletcher, Jr.
Attesting Officer

WILLIAM E. SCHUYLER, JR.
Commissioner of Patents